United States Patent
Parida

(10) Patent No.: US 11,550,373 B2
(45) Date of Patent: Jan. 10, 2023

(54) VAPOR CHAMBER LIDS

(71) Applicant: International Business Machines Corporation, Armonk, NY (US)

(72) Inventor: Pritish Ranjan Parida, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 16/882,419

(22) Filed: May 22, 2020

(65) Prior Publication Data

US 2021/0365088 A1   Nov. 25, 2021

(51) Int. Cl.
| | |
|---|---|
| G06F 1/20 | (2006.01) |
| F28F 9/00 | (2006.01) |
| G06F 30/20 | (2020.01) |
| H01L 23/427 | (2006.01) |
| G06F 111/10 | (2020.01) |

(52) U.S. Cl.
CPC .............. *G06F 1/206* (2013.01); *F28F 9/001* (2013.01); *G06F 30/20* (2020.01); *H01L 23/427* (2013.01); *F28F 2200/005* (2013.01); *G06F 2111/10* (2020.01)

(58) Field of Classification Search
CPC ...... G06F 1/206; G06F 30/20; G06F 2111/10; F28F 9/001; F28F 2200/005; H01L 23/427
See application file for complete search history.

(56) References Cited

U.S. PATENT DOCUMENTS

| | | | |
|---|---|---|---|
| 9,208,269 | B2 | 12/2015 | Liang et al. |
| 10,217,692 | B2 | 2/2019 | Haj-Hariri et al. |
| 10,409,929 | B2 | 9/2019 | Johansen |
| 10,492,333 | B2 | 11/2019 | Moghaddam et al. |

OTHER PUBLICATIONS

Patankar Characterization, Modeling and Design of Ultra-Thin Vapor Chamber Heat Spreaders Under Steady-State and Transient Conditions School of Mechanical Engineering, West Lafayette, Indiana, May 2019 (Year: 2019).*

(Continued)

*Primary Examiner* — Rehana Perveen
*Assistant Examiner* — Cuong V Luu
(74) *Attorney, Agent, or Firm* — Daniel Morris; Otterstedt & Kammer PLLC

(57) ABSTRACT

Obtain a putative design for a vapor chamber lid for an electronic device; iteratively: obtain a steady state solution of governing equations of the putative design, wherein the governing equations include a thermal energy equation in a solid domain of the putative design and include continuity, momentum, and energy equations in vapor and liquid/wick domains of the putative design; modify the putative design in response to a difference between the evaporator temperature of the steady state solution and a threshold value for evaporator temperature; and obtain a new steady state solution of the governing equations for the putative design; and set a final design for the vapor chamber lid when a satisfactory result is obtained for the difference between the evaporator temperature and the threshold value for evaporator temperature.

18 Claims, 10 Drawing Sheets

(56) References Cited

OTHER PUBLICATIONS

Ranjan et al. Modeling and Design Optimization of Ultrathin Vapor Chambers for High Heat Flux Applications, IEEE Transactions on Component Packaging and Manufacturing Technology, vol. 2, No. 9, Sep. 2012 (Year: 2012).*

H.J. Eggink et al. "Numerical and Experimental Feasibility Study of Vapor Chambers for LED Applications," 34th Semi-Therm Symposium, Mar. 2018, San Jose, California, pp. 1-10.

Ram Ranjan, "Two-Phase Heat and Mass Transfer in Capillary Porous Media," Ph.D. Thesis, Oct. 2011, Purdue University, pp. 1-360.

Yasushi Koito et al. "Fundamental Experiments and Numerical Analyses on Heat Transfer Characteristics of a Vapor Chamber (Effect of Heat Source Size)," JSME Intl. J., Nov. 2006, Series B, vol. 49:4, pp. 1233-1240.

Gaurav Patakar, et al. "Patterning the Condenser-Side Wick in Ultra-Thin Vapor Chamber Heat Spreaders to Improve Skin Temperature Uniformity of Mobile Devices," CTRC Research Publications, Oct. 2016, pp. 1-39.

Unnikrishnan Vadakkanmaru Veedu, "Transient Three-Dimensional modeling of Flat Heat Pipes with Discrete Heat Sources," Ph.D. Thesis, May 2004, Purdue University, pp. 1-196.

\* cited by examiner

VAPOR CHAMBER LIDS

BACKGROUND

The present invention relates to the electrical, electronic, thermal, and computer arts, and more specifically, to cooling microprocessors.

Heat density in electronic devices such as a microprocessor chips is increasing, and in order to maintain safe operating temperatures, advancement in thermal management techniques is required. The thermal performance of current microprocessor lids/heat spreaders can be improved by integrating two-phase cooling within the conventionally used lid/heat spreader without compromising its structural rigidity. Such lids with integrated two-phase cooling are referred to as vapor chamber lids.

Conventional approaches for modeling heat transfer in vapor chamber lids use a transient time-stepping method to attain a steady state solution. A simple two-dimensional simulation can take two to three days to obtain a steady state solution. As such, optimization of cooling structures using the transient approach can take a few months to years.

Further, these modeling approaches estimate the mass flux at the liquid-vapor interface near the condenser side as a function of the temperature delta to the vapor core temperature. This method of estimation results in a flatter temperature profile at the condenser side, suggesting ideal heat spreading, which is unrealistic and an artifact of the estimation method.

SUMMARY

Principles of the invention provide techniques for building vapor chamber lids. In one aspect, an exemplary method includes obtaining a putative design for a vapor chamber lid for an electronic device; obtaining a steady state solution of governing equations of the putative design, wherein the governing equations include a thermal energy equation in a solid domain of the putative design and include continuity, momentum, and energy equations in vapor and liquid/wick domains of the putative design, by: calculating evaporator mass flux, evaporator heat flux, and evaporator temperature from the governing equations using an estimated vapor core temperature as a boundary condition; calculating condenser mass flux, condenser heat flux, and condenser temperature from the governing equations using evaporator mass flux, evaporator heat flux, and evaporator temperature as boundary conditions; calculating a power error between power produced by the electronic device and power emitted to ambient from the governing equations using the evaporator mass flux, evaporator heat flux, evaporator temperature, condenser mass flux, condenser heat flux, condenser temperature, and estimated vapor core temperature as boundary conditions; adjusting the estimated vapor core temperature using the power error; and repeating calculations of the evaporator mass flux, evaporator heat flux, evaporator temperature, condenser mass flux, condenser heat flux, condenser temperature, and power error and adjustment of the estimated vapor core temperature until the power error is less than a threshold value for power error; iteratively: modifying the putative design in response to a difference between the evaporator temperature of the steady state solution and a threshold value for evaporator temperature, and obtaining a new steady state solution of the governing equations for the putative design; and setting a final design for the vapor chamber lid when a satisfactory result is obtained for the difference between the evaporator temperature and the threshold value for evaporator temperature.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Simulation of thermo-hydraulic performance of two-phase flow in complex cooling structures by a computationally manageable approach to perform trade-off analysis and design optimization.

Reduced computational workload with improved accuracy, thus improving the performance of the computer performing the thermal analysis (less CPU time required).

Improved accuracy with increased speed of calculation.

Reduced time from concept to build of vapor chamber lids.

Increased thermal efficiency of vapor chamber lids.

Enables a quick design space exploration for complicated 3D dimensional vapor chamber heat spreaders.

First, one or more embodiments use the convection in the vapor core to derive the mass flux and heat flux profile at the liquid-vapor interface near the condenser side, thereby providing a more accurate temperature profile. Second, one or more embodiments use a mass-flux linearization to estimate the mass-flux at the liquid-vapor interface near the evaporator side and use a steady state approach to solve governing equations of the heat transfer system, thereby significantly reducing the computational time.

These and other features and advantages of the present invention will become apparent from the following detailed description of illustrative embodiments thereof, which is to be read in connection with the accompanying drawings.

DETAILED DESCRIPTION

Figure 1:
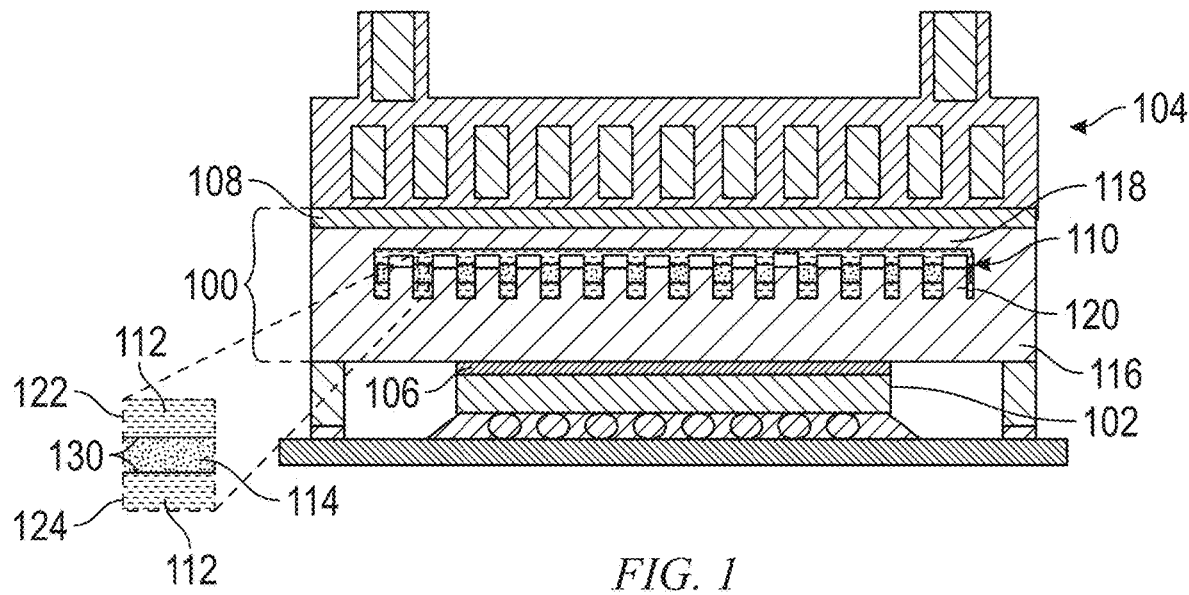
FIG. 1 depicts a schematic of a vapor chamber lid attached between a chip and a heat sink.

FIG. 1 depicts a schematic of a vapor chamber lid 100 attached between a chip 102 and a heat sink 104. The vapor chamber lid 100 is in thermal contact with the chip 102 and heat sink 104 via thermal interface material 106, 108. The lid 100 encloses a chamber 110 that is filled with a mix of liquid 112 and vapor 114 coolant. When the chip 102 is cold the liquid 112 saturates the wick 124 at the bottom of the chamber, adjacent evaporator 116, and also saturates the wick 122 at the top of the chamber 110, adjacent condenser 118 ("top" and "bottom" in this case being relative to the gravitational field). The vapor 114 occupies the remaining space of the chamber 110. The quantity of the coolant within the chamber 110 is selected so that when the chip 102 is cold, the liquid 112 completely saturates the wicks inside the chamber 110. The chamber 110 also houses an element 120 that feeds the condensed liquid 112 from the top of the chamber back to the bottom of the chamber, where it evaporates again at the liquid/vapor interface 130. The element 120 can either be a wick similar to elements 122 and 124 or it could be a pin-fin type extension of the evaporator 116 surface. In a configuration as shown in FIG. 1, the direction of gravity is favorable for the condensate to return to the evaporator side wick. In some other configurations, where a computer server could be placed vertically instead of horizontally, the entire package could be in a different orientation. In that case, the direction of gravity might not be favorable, which could result in reduced thermal performance of the vapor chamber lid.

Figure 2:
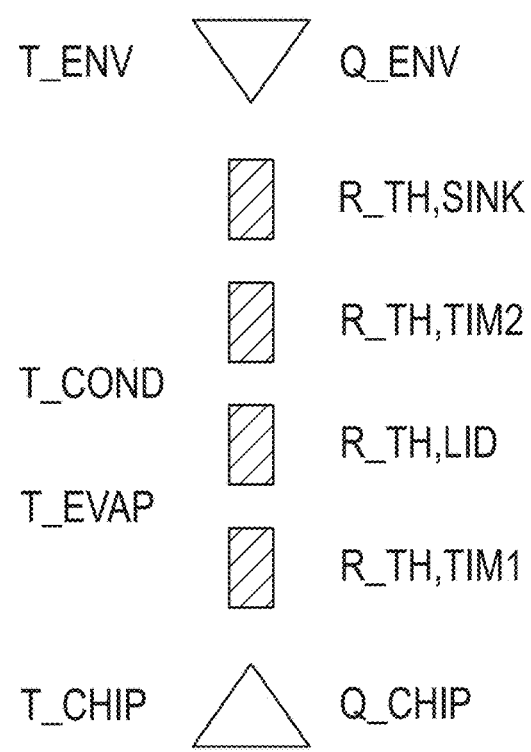
FIG. 2 depicts a schematic of thermal resistance for the vapor chamber lid apparatus shown in FIG. 1.

FIG. 2 depicts a schematic of thermal resistance for the vapor chamber lid apparatus 100 of FIG. 1. Between the chip 102 at temperature T_CHIP and the vapor chamber lid evaporator 116 at T_EVAP, the thermal interface material 106 presents thermal resistance R_TH,TIM1. Between the evaporator 116 and the condenser 118 at T_COND, the vapor chamber lid 100 presents thermal resistance R_TH, LID between temperatures T_EVAP and T_COND. Between the condenser 118 and ambient environment at temperature T_ENV, the thermal interface material 108 presents thermal resistance R_TH,TIM2 while the heat sink 104 presents thermal resistance R_TH,SINK. Overall, heat flux out from the chip Q_CHIP is equal to the heat flux into the environment Q_ENV.

Figure 3:
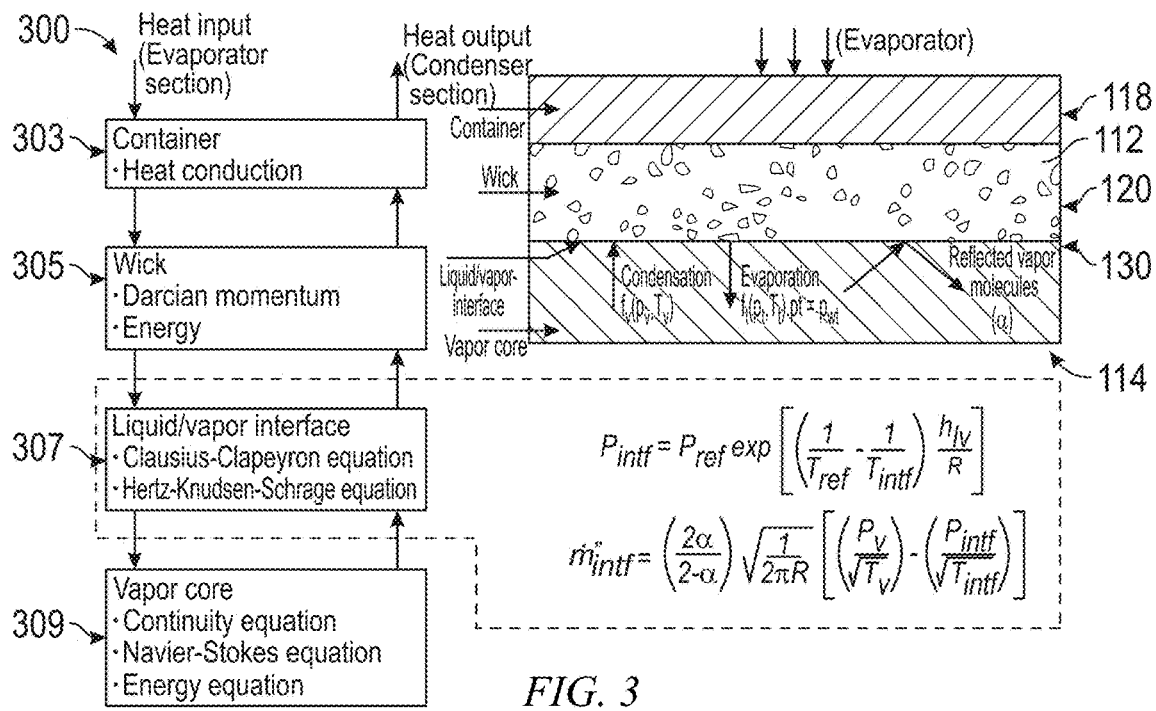
FIG. 3 depicts a schematic of a state of the art model for heat transfer in the vapor chamber lid shown in FIG. 1.

FIG. 3 depicts a schematic of a state of the art model 300 for heat transfer in the vapor chamber lid 100. The model 300 includes the condenser 118, the condenser side wick 122, the liquid 112, the vapor 114, and a vapor-liquid interface 130. The model 300 also includes governing equations 303 for the condenser 118, 305 for the wick 122 and liquid 112, 307 for the vapor-liquid interface 130, and 309 for the vapor 114.

Figure 4:
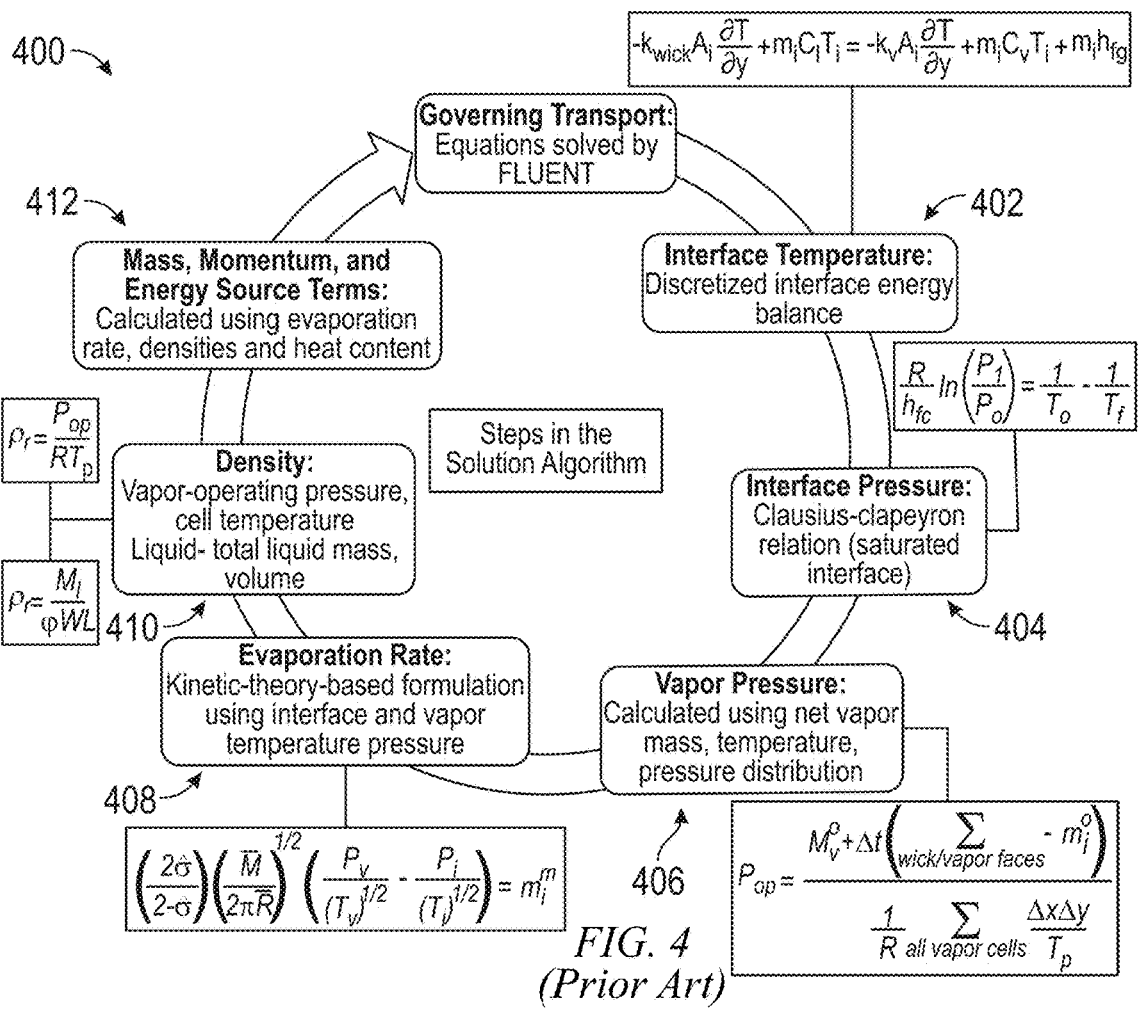
FIG. 4 depicts a state of the art algorithm for predicting heat transfer by solving governing equations of the model shown in FIG. 3.

FIG. 4 depicts a state of the art algorithm 400 for predicting heat transfer by solving the governing equations of the model 300. At 402, obtain the temperature at the vapor-liquid interface 306 using a discretized interface energy balance. At 404, obtain the pressure at the vapor-liquid interface 306 using the Clausius-Clapeyron relation for a saturated interface. At 406, calculate vapor pressure using net vapor mass, temperature, and pressure distribution. At 408, estimate evaporation rate by a kinetic-theory-based formulation based on interface and vapor temperature and pressure. At 410, calculate density of the vapor based on operating pressure and temperature, and calculate density of the liquid based on total liquid mass and volume. At 412, obtain mass, momentum, and energy source terms using evaporation rate, densities, and heat content. Repeat until the solution converges.

Figure 5:
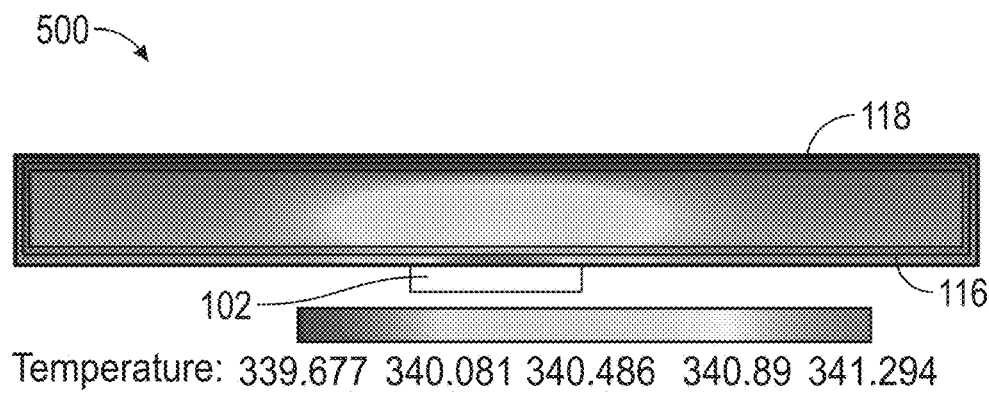
FIG. 5 depicts a heat map of an unrealistic condenser side temperature profile produced by the algorithm shown in FIG. 4.

FIG. 5 depicts an unrealistic condenser side temperature profile 500 produced by the algorithm 400. Note the peak temperature directly over the chip 102 that is then diffused throughout the entire width of the vapor chamber 110 (shown in FIG. 1). This does not match empirical evidence (see discussion of FIG. 11, below), which has the peak temperature from above the chip (left most stack of symbols $T_b$) transmitted most of the way through the vapor chamber to the condenser side (symbol stack $T_3$) with little lateral diffusion.

Figure 6:
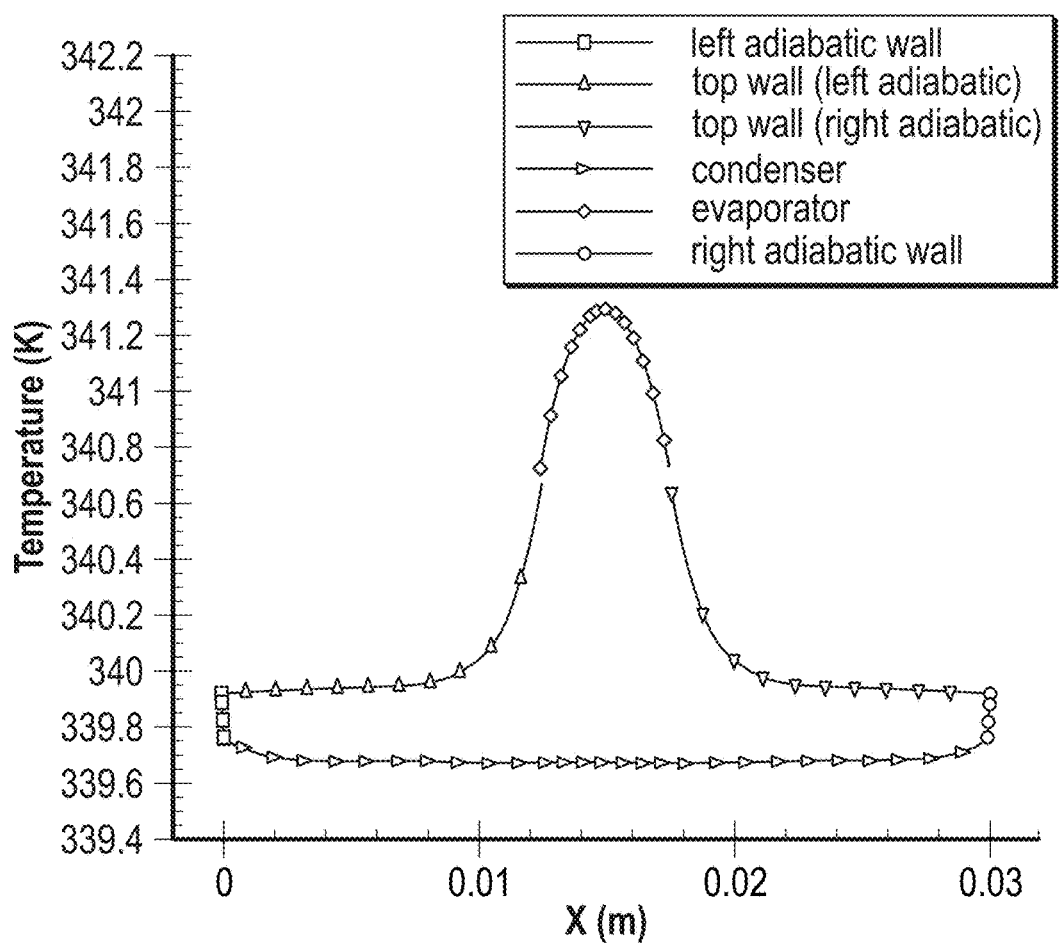
FIG. 6 depicts a graph of the unrealistic condenser side temperature profile shown in FIG. 5.

FIG. 6 depicts a graph of the unrealistic condenser side temperature profile 500 shown in FIG. 5. From the graph it can be seen that the temperature profile at the condenser side is nearly flat while the temperature profile on the evaporator side is quite non-uniform. This suggests that the heat spreading in the vapor core is nearly perfect and, in some sense, almost independent of the vapor chamber 110 thickness. In other words, if one uses the algorithm shown in FIG. 3 and FIG. 4, for a vapor chamber having 0.1× or 10× the chamber 110 height compared to the that shown in FIG. 5, they will still obtain almost identical chip temperature in both cases which is un-realistic.

Figure 7:
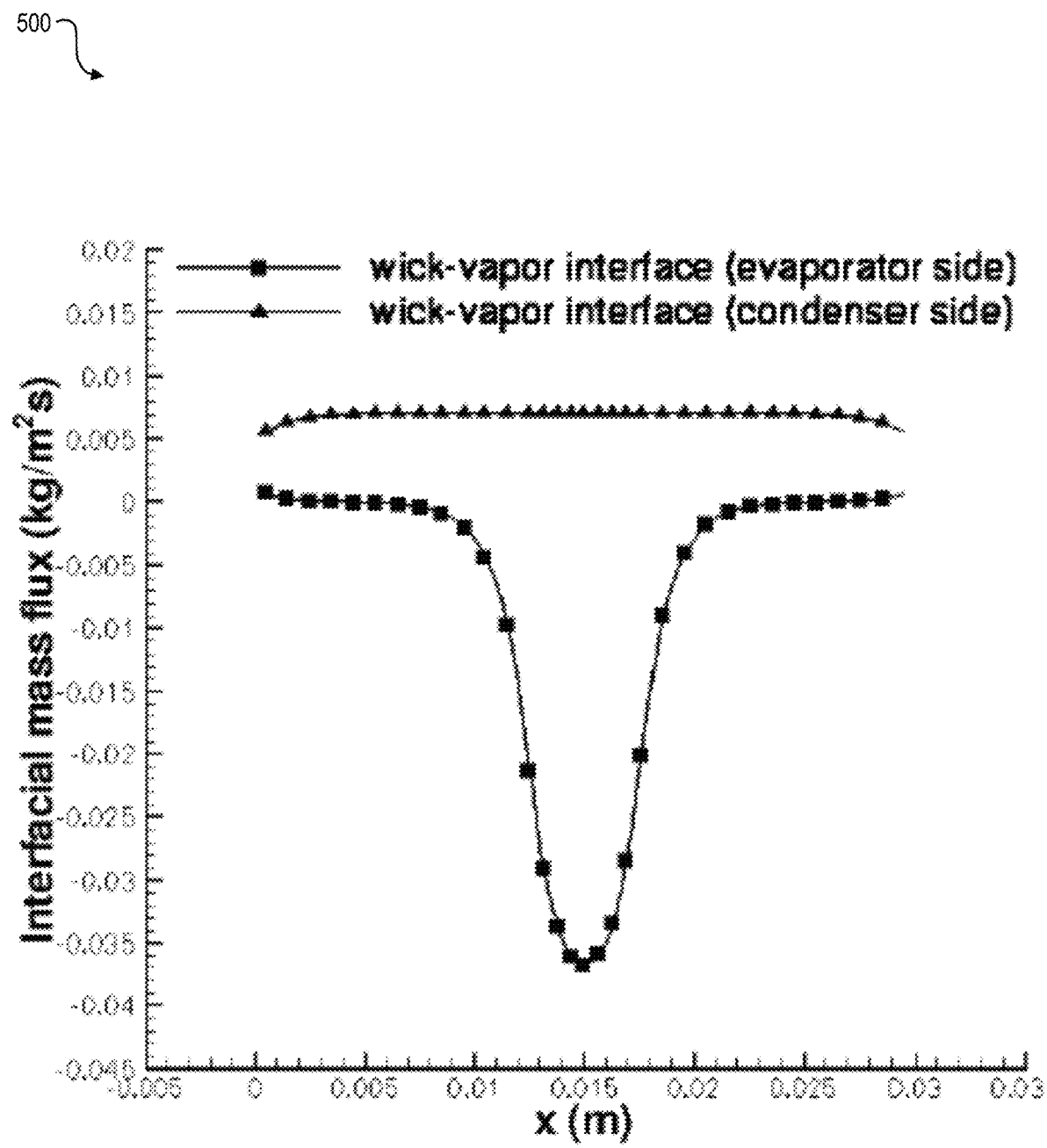
FIG. 7 depicts a graph of an unrealistic mass flux balance produced by the algorithm shown in FIG. 4.

FIG. 7 depicts a graph of an unrealistic mass flux balance produced by the algorithm shown in FIG. 4. If this were to be physically possible, this graph suggests that irrespective of the thickness of the chamber 110, a jet of vapor that enters the chamber 110 through the liquid/vapor interface 130 on the evaporator side completely homogenizes (that is, spreads uniformly over the maximum possible area) by the time it reaches the liquid/vapor interface 130 on the condenser side. This un-realistic spreading behavior is an artifact of using a temperature dependent function 307 for mass flux estimation at the condenser side instead of using conservation of momentum in the vapor core region.

Figure 8:
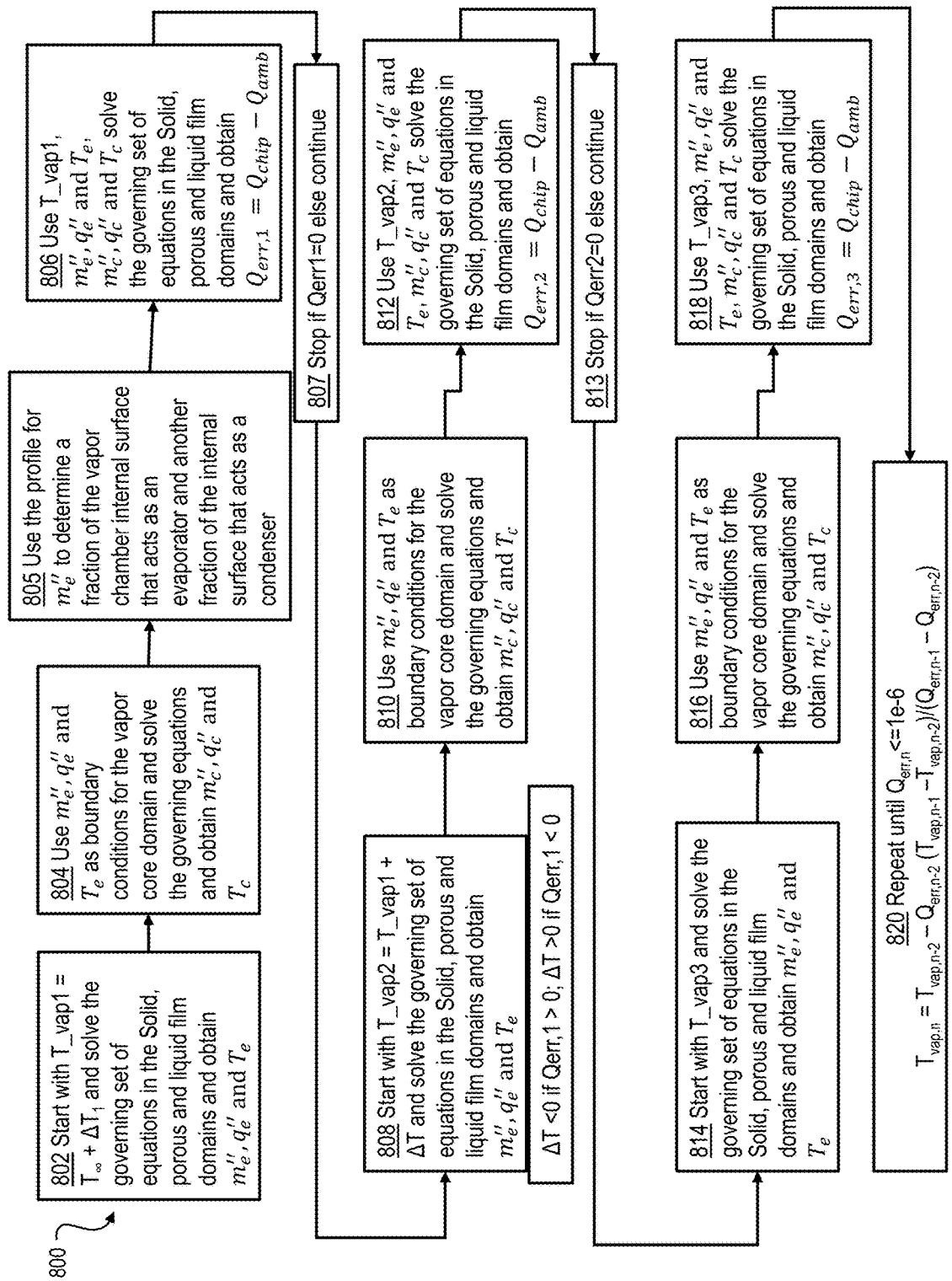
FIG. 8 depicts an algorithm for predicting heat transfer in the vapor chamber lid shown in FIG. 1, according to an exemplary embodiment.

FIG. 8 depicts an inventive algorithm 800 for modeling heat transfer in the vapor chamber lid shown in FIG. 1. Start at 802 with $T_{(vap1)} = T_\infty + \Delta T_1$ and obtain $m_e"$, $q_e"$, $T_e$ (mass flux, heat flux, and temperature at the evaporator surface of the vapor chamber) by solving a governing set of equations in the solid, porous and liquid film domains with appropriate material properties and boundary conditions and a (Root Mean Square, RMS) residual target of 1e-8. The governing equations include solving the energy equation for all the domains and for the porous and liquid film domains solving the continuity equation as well as three momentum equations (one each for x, y and z directions). Note that $T_\infty = T\_ENV$ = ambient temperature.

Governing Equations:

In the solid domain, only the thermal energy equation, as expressed by Equation (1), is solved.

$$\nabla \cdot (\lambda_s \nabla T) + S_E = 0 \tag{1}$$

where, $\lambda_s$ is the thermal conductivity for the solid, T is temperature and $S_E$ is optional volumetric energy source term.

In the vapor and liquid-wick domains, one set of continuity, momentum, energy equations is solved.

Continuity Equation (Wick/Liquid):

$$\nabla \cdot (\rho U) = S_l \tag{2}$$

where, $S_l$ is the mass source/sink term applied at the liquid-vapor interfaces to capture the phase change mass transfer to and from the liquid phase.

Momentum Equation (Wick/liquid):

$$\nabla \cdot (\rho U \otimes U) = -\nabla(\phi p) + \mu \nabla \cdot (\nabla U + (\nabla U)^T) - \frac{\mu \phi}{K} U \tag{3}$$

where, U is the velocity field, p is the pressure, ρ is the density, μ is the viscosity, φ is the wick porosity and K is the wick permeability. For liquid films, φ=1 and K=∞.

Energy Equation (Wick/Liquid):

In the liquid-phase of the porous domain:

$$\nabla \cdot (\rho UH) = \nabla \cdot (\lambda_f \phi \nabla T) + S_E + Q_{fs} \tag{4}$$

In the solid-phase of the porous domain:

$$\nabla \cdot (\lambda_s (1-\phi) \nabla T) + S_E + Q_{sf} = 0 \tag{5}$$

where, $\lambda_f$ is the thermal conductivity for the fluid, H is the fluid specific enthalpy and T is the temperature. $S_E$ is the energy source/sink term required at the liquid-vapor interfaces to capture the phase change heat transfer. $Q_{fs}$ is interfacial energy transfer per unit volume from the fluid to the solid phase of the porous domain and is expressed as:

$$Q_{fs} = -Q_{sf} = hA_{fs}(T_s - T_f) \tag{6}$$

where, $A_{fs}$ is the interfacial area density and h is the overall heat transfer coefficient between the fluid phase and the solid phase of the porous domain. $T_s$ and $T_f$ are the solid and fluid phase temperature. In the present work a high value for h and $A_{fs}$ was selected to ensure $T_s$ equals $T_f$.

Continuity Equation (Vapor Core):

$$\nabla \cdot (\rho U) = S_V \tag{7}$$

where, ρ is the density, U is the velocity field, and $S_V$ is the mass source/sink term applied at the liquid-vapor interfaces to capture the phase change mass transfer to and from the vapor phase.

Momentum Equation (Vapor Core):

$$\nabla \cdot (\rho U \otimes U) = -\nabla p + \nabla \cdot (\mu(\nabla U + (\nabla U)^T)) \tag{8}$$

where, U is the velocity field, p is the pressure, μ is viscosity, and ρ is the density. Under the ideal gas assumption for the vapor core, the density is expressed as:

$$\rho = \frac{M p_{abs}}{R T_{vap}} \tag{9}$$

where, M is the molecular weight, $p_{abs}$ is the absolute pressure, R is the universal gas constant and $T_{vap}$ is the vapor temperature. The relationship between the saturation temperature and the saturation pressure is computed using the Clausius-Clapeyron equation.

Energy Equation (Vapor Core):

$$\nabla \cdot (\rho UH) = \nabla \cdot (\lambda \nabla T) + S_E \tag{10}$$

where, λ is the thermal conductivity, U is the velocity field, H is the fluid specific enthalpy, T is the coolant temperature and $S_E$ is the energy source/sink term.

Liquid-Vapor Interface (Evaporation):

The mass flux ($\dot{m}"$) due to evaporation at the wick-vapor or liquid film-vapor interface is approximated using a linearized form of the Hertz-Knudsen-Schrage equation as expressed below.

$$\dot{m}" = \frac{2\sigma}{2-\sigma} \frac{h_{fg} \rho_{vap}}{R T_{sat}^2} \left(\frac{1}{2\pi R}\right)^{0.5} (T_{int} - T_{sat}) \tag{11}$$

where, σ is the accommodation coefficient which can have any value greater than zero and less than equal to 1. $T_{int}$ is the local interface temperature and $T_{sat}$ is the saturation temperature. The linearization is in terms of temperature which helps improve solver stability for complex flow profiles and vapor chamber designs. A positive value for mass flux indicates the mass is leaving the liquid phase (evaporation). The associated heat flux ($\dot{q}"$) due to evaporation is expressed as:

$$\dot{q}" = \dot{m}" h_{fg} \tag{12}$$

where, $h_{fg}$ is the latent heat of vaporization.

Liquid-Vapor Interface (Condensation):

The fraction of the wick-vapor interface where the mass flux estimated by equation (11) is negative, is considered to be the condenser section. The mass flux at these locations is computed using the convection of vapor entering the vapor core through the evaporation section of the interfaces. From mass and momentum conservation within the vapor core, the mass flux and the associated heat flux at the condenser section is evaluated.

At 804, use $m_e"$, $q_e"$, $T_e$ as boundary conditions for the vapor core domain and obtain $m_c"$, $q_c"$, $T_c$ (mass flux, heat flux, and temperature at the condenser surface of the vapor chamber) by solving the governing equations.

At 805, using the profile for $m_e''$, determine a fraction of the vapor chamber internal surface that acts as an evaporator and another fraction of the internal surface that acts as a condenser. The vapor chamber internal surface may also be referred to as the wick-vapor or liquid film-vapor interface and in some exemplary case as solid-vapor interface. These fractions will affect the solutions of the governing equations at subsequent steps in a manner apparent to the ordinary skilled worker in light of this disclosure. For example, the boundary between evaporator and condenser is determined by a zero value of $m_e''$; where less than zero indicates the evaporator surface and where greater than or equal to zero (for convenience of calculation) indicates the condenser surface.

At 806, use $T_{(vap1)}$, $m_e''$, $q_e''$, $T_e$ as well as $m_c''$, $q_c''$, $T_c$ to solve the governing set of equations in the solid, porous and liquid film domains and obtain $Q_{(err,1)} = Q_{(in)} - Q_{(out)}$. At 807, stop if $Q_{(err,1)} = 0$ otherwise, continue.

At 808, use $T_{(vap2)} = T_{(vap1)} + \Delta T$ and obtain $m_e''$, $q_e''$, $T_e$ by solving the governing set of equations in the solid, porous and liquid film domains. In solving the governing equations, $\Delta T < 0$ if $Q_{(err,1)} > 0$; $\Delta T > 0$ if $Q_{(err,1)} < 0$. The initial magnitude of $\Delta T$ may be chosen empirically or using the equation, $\Delta T = Q_{(in)}/(h_{cond} A_{cond})$, where $h_{cond}$ is the average heat transfer coefficient on the condenser side's exterior surface and $A_{cond}$ is the area of that surface.

At 810, use $m_e''$, $q_e''$, $T_e$ as boundary conditions for the vapor core domain and obtain $m_c''$, $q_c''$, $T_c$ by solving the governing equations.

At 812, use $T_{(vap2)}$, $m_e''$, $q_e''$, $T_e$, $m_c''$, $q_c''$, $T_c$ to obtain $Q_{(err,2)} = Q_{(in)} - Q_{(out)}$ by solving the governing set of equations in the solid, porous and liquid film domains. At 813, stop if $Q_{(err,2)} = 0$ otherwise, continue.

At 814, start with $T_{(vap3)} = T_{(vap1)} - Q_{(err1)}(T_{(vap2)} - T_{(vap1)})/(Q_{(err2)} - Q_{(err1)})$ and obtain $m_e''$, $q_e''$, $T_e$ by solving governing set of equations in the solid, porous and liquid film domains.

At 816, use $m_e''$, $q_e''$, $T_e$ as boundary conditions for the vapor core domain and obtain $m_c''$, $q_c''$, $T_c$ by solving the governing equations.

At 818, use $T_{(vap3)}$, $m_e''$, $q_e''$, $T_e$, $m_c''$, $q_c''$, $T_c$ to obtain $Q_{(err3)} = Q_{(in)} - Q_{(out)}$ by solving the governing set of equations in the solid, porous and liquid film domains.

At 820, repeat using $$T_{(vap,n)} = T_{(vap,n-2)} - Q_{(err,n-2)} (T_{(vap,n-1)} - T_{(vap,n-2)})/(Q_{(err,n-1)} - Q_{(err,n-2)})$$

until convergence, e.g., in one or more embodiments repeat until $Q_{(err,n)} \leq 1 \times 10^{-6}$. Calculations according to the method 800 exhibit greater computational efficiency and converge faster than do calculations according to the method 400, at least because in method 800, the governing set of equations are not iteratively solved at each transient time-step but instead are solved as time-invariant, which helps in computational speed-up of typically at least two orders of magnitude over method 400. The time-invariant/pseudo-steady state solution approach as described in method 800 can be used because the intrinsic time constants of the two-phase behavior inside the vapor chamber are much shorter (typically, one or more orders of magnitude) than the intrinsic time-constants associated with heat transfer from the heat source to the internal surface of the vapor chamber. The method 800 produces more realistic results than do calculations according to the method 400, at least because the method 800 uses conservation of momentum in the vapor core region to estimate mass flux at the condenser side. If method 400 is used for vapor chamber modeling/design, it will not be possible to understand the flow behavior inside the vapor core nor will it be possible to understand the effect of vapor core dimensions. With method 800, the flow characteristics inside the vapor chamber can be better understood, as well as the effect of vapor core dimensions which will help the vapor chamber lid designer in generating a design appropriate for the potential application.

Figure 9:
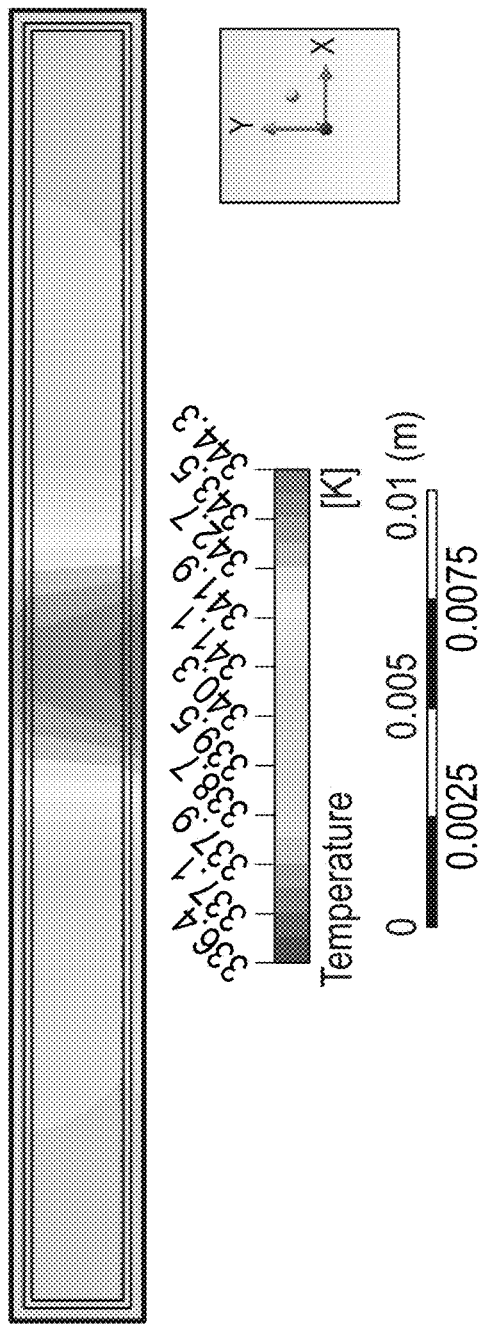
FIG. 9 depicts a heat map of a more realistic condenser side temperature profile produced by the algorithm shown in FIG. 8.

FIG. 9 depicts a heat map of a more realistic condenser side temperature profile 900 produced by the algorithm 800 shown in FIG. 8. Note the profile 900 has a high temperature zone extending upward from the evaporator through the center of the vapor chamber to the condenser, with less lateral heat spread than the profile 500. In the vapor chamber configuration, the evaporation section and the condenser section are thermally connected and are interchangeable depending upon the input heat flux profile and magnitude. In this case, the condenser and evaporator portion of the wick-vapor interface is found iteratively such that mass transfer through the vapor core as well as heat transfer across the vapor chamber are conserved.

Figure 10:
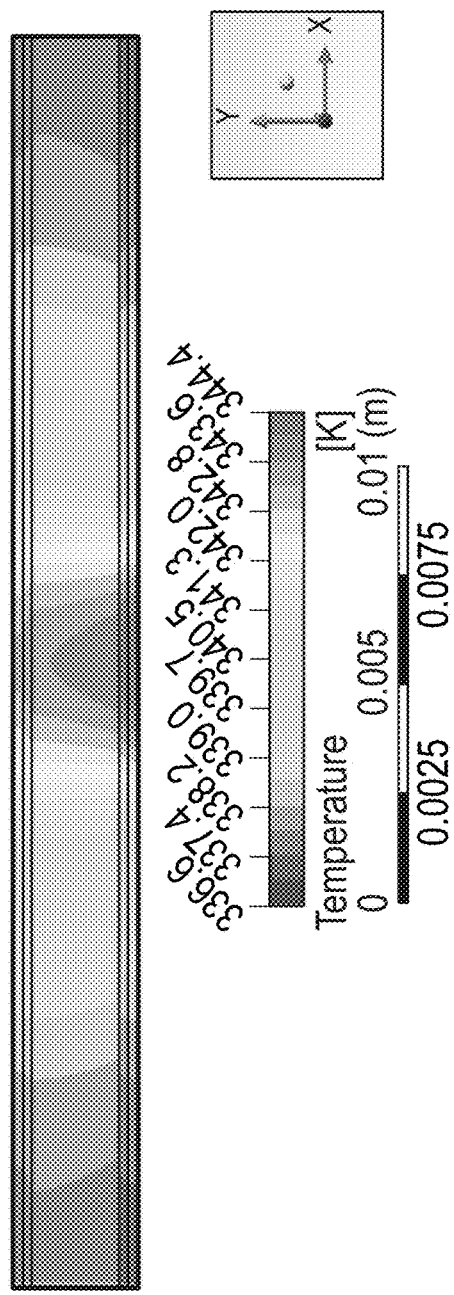
FIG. 10 depicts a heat map of another more realistic condenser side temperature profile produced by a variant of the algorithm shown in FIG. 8.

FIG. 10 depicts a heat map of another more realistic condenser side temperature profile 1000 produced by a variant of the algorithm 800 shown in FIG. 8 for a limiting vapor chamber configuration. In this configuration, evaporation section and the condenser section of the wick-vapor interface are separate or geometrically distinguishable. In this instance of the configuration shown in FIG. 9, the vapor chamber is wide enough that the solid material on the far edges does not influence the heat transfer through the vapor chamber. In this vapor chamber design, the copper wall and the wick at the far edges are removed compared to the model shown in FIG. 9. In this case, there are two clear wick-vapor interfaces—one for the evaporator side and the other for the condenser side. The mass flux on the condenser side interface is computed using the diffusion through the vapor core. FIG. 9 and FIG. 10 show that the peak evaporator side temperature was observed to be similar for both structures.

Figure 11:
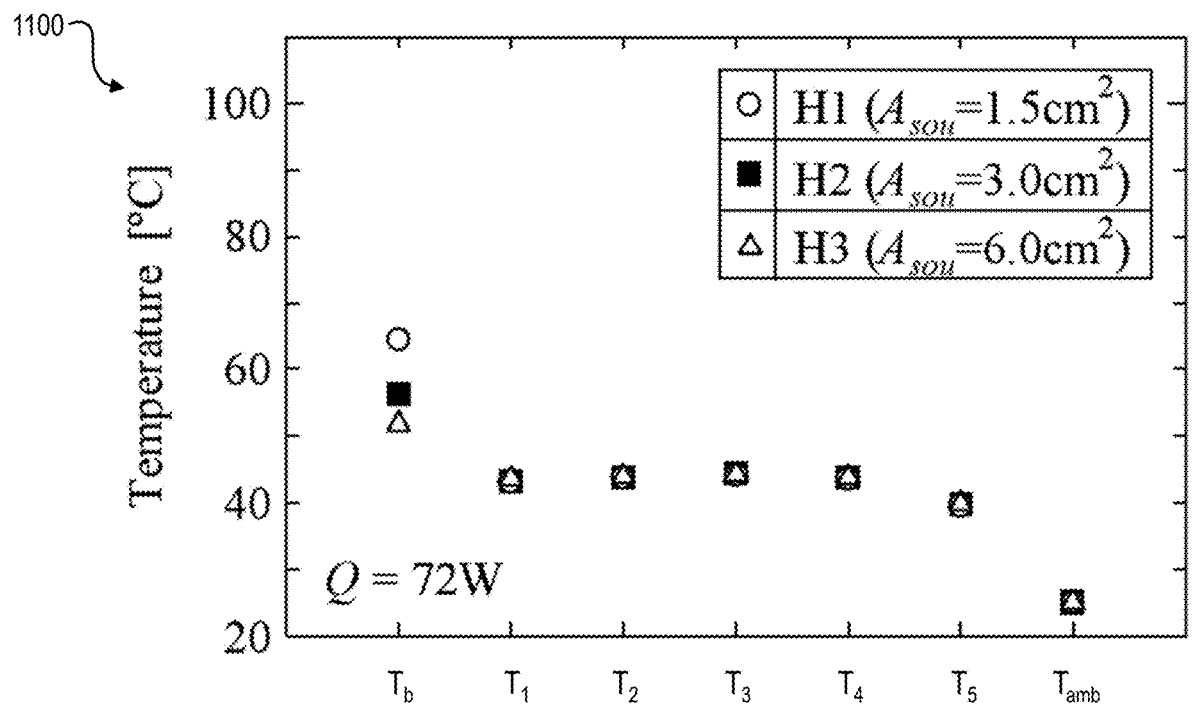
FIG. 11 depicts three experimental condenser side temperature profiles produced by other researchers.

FIG. 11 depicts experimental condenser side temperature profiles for three different evaporator side heat input areas H1 (1.5 cm$^2$), H2 (3 cm$^2$), and H3 (6 cm$^2$), which other researchers measured for different sizes of heat source (different chips). Note that the experimental condenser side temperature profiles closely match each other except at the evaporator next to the chip (symbol stack $T_b$). Note also, in each temperature profile the peak temperature from above the chip (left-most stack of symbols $T_b$) is transmitted most of the way through the vapor chamber to the condenser side (symbol stack $T_3$) with little lateral diffusion.

Figure 12:
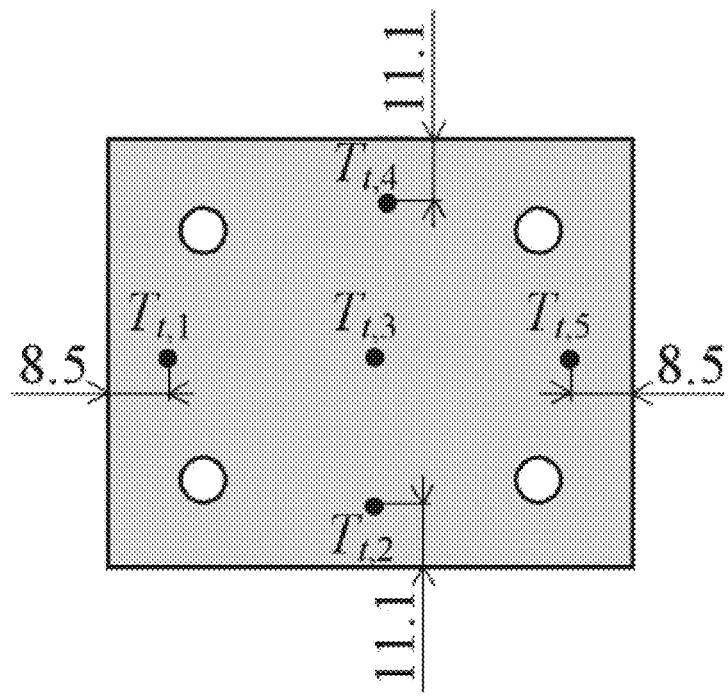
FIG. 12 validates two condenser side temperature profiles produced by the algorithm shown in FIG. 8 against two of the condenser side temperature profiles shown in FIG. 11.

FIG. 12 depicts a top view of the vapor chamber lid 100, marked with locations $T_1$, $T_2$, $T_3$, $T_4$, $T_5$ corresponding to the symbols stacks in FIG. 11 and FIG. 13 (discussed below).

Figure 13:
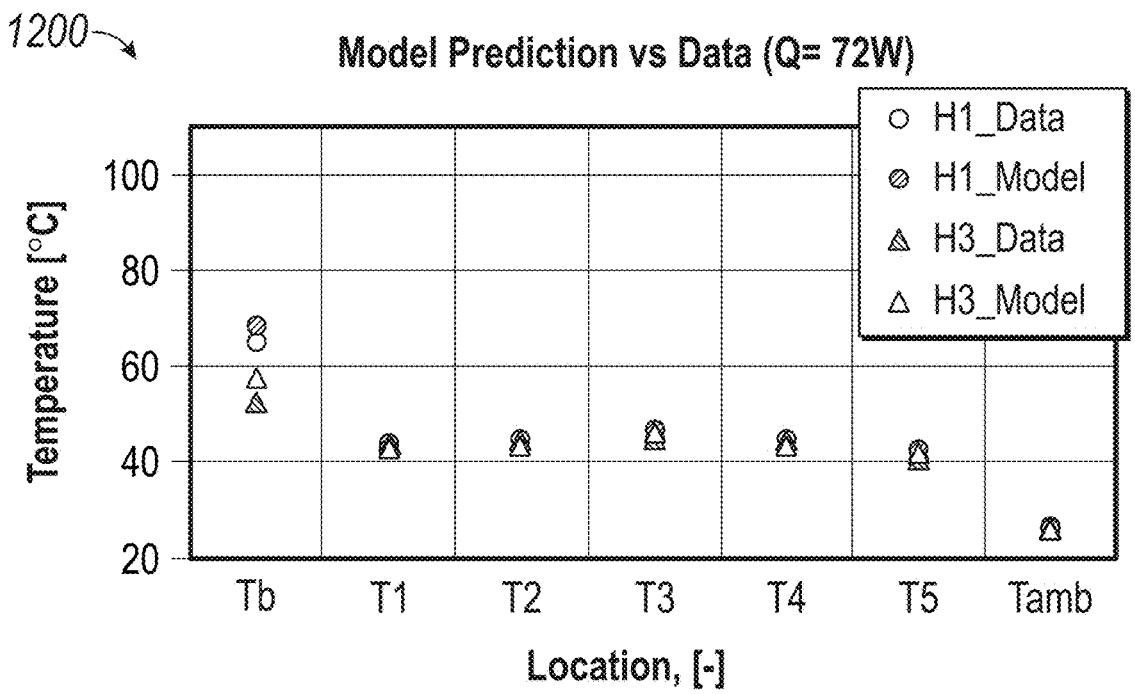
FIG. 13 depicts experimental temperature profiles for two different sizes of heat generator (chip) compared to modeled temperature profiles.

FIG. 13 depicts a graph 1200 that validates two predicted condenser side temperature profiles 900, 1000 produced by the algorithm shown in FIG. 8 against two of the measured condenser side temperature profiles for H1, H3 as shown in FIG. 11. Note that the predicted temperature profiles closely match the measured temperature profiles. H1 corresponds to a chip surface area of 1.5 cm$^2$ while H3 corresponds to a chip surface area of 6.0 cm$^2$, both with heat generation of 72 W.

Figure 14:
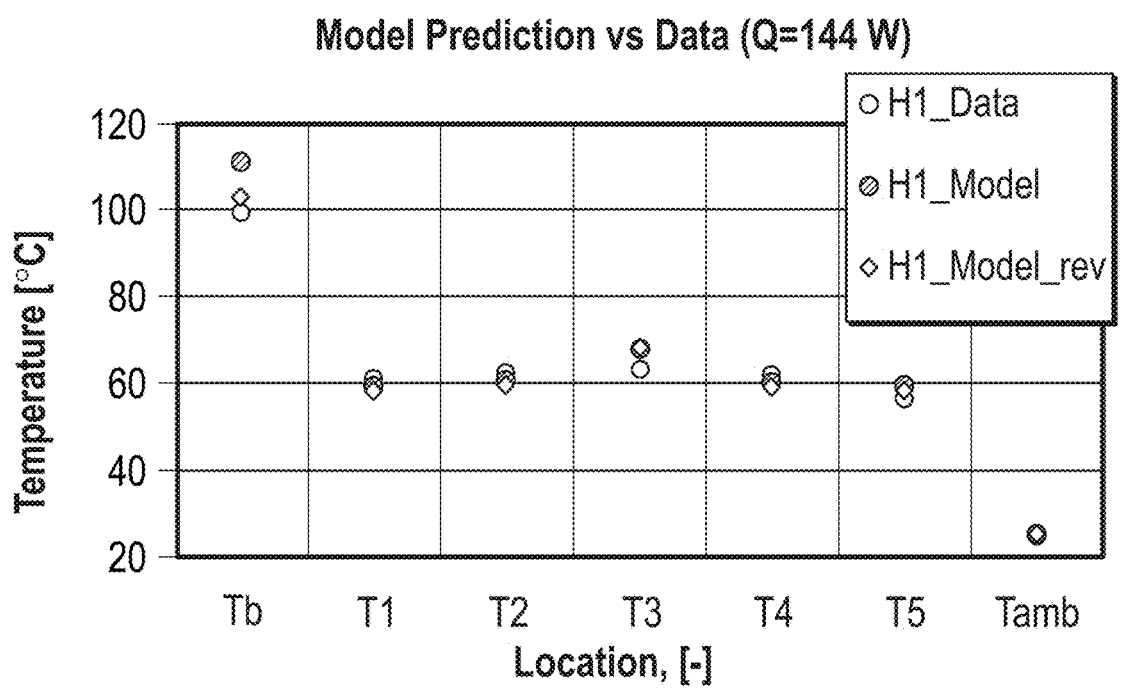
FIG. 14 depicts two temperature profiles resulting a parametric study of two different models of mass and heat transport in the vapor chamber using the algorithm shown in FIG. 6, compared to experimental data.

FIG. 14 depicts results from a parametric study using the algorithm shown in FIG. 8. To obtain the predicted temperature profile plotted as H1_model_rev, the following changes were made from the model that produced the predicted temperature profile plotted as H1_model:

Effective thermal conductivity of the wick was increased from 4 to 16 W/m-K. This change reduced the evaporator temperature ($T_b$), increased the condenser side central temperature (T3), and had no substantial effect on far-field condenser side temperatures (T1,2,4,5).

Figure 15:
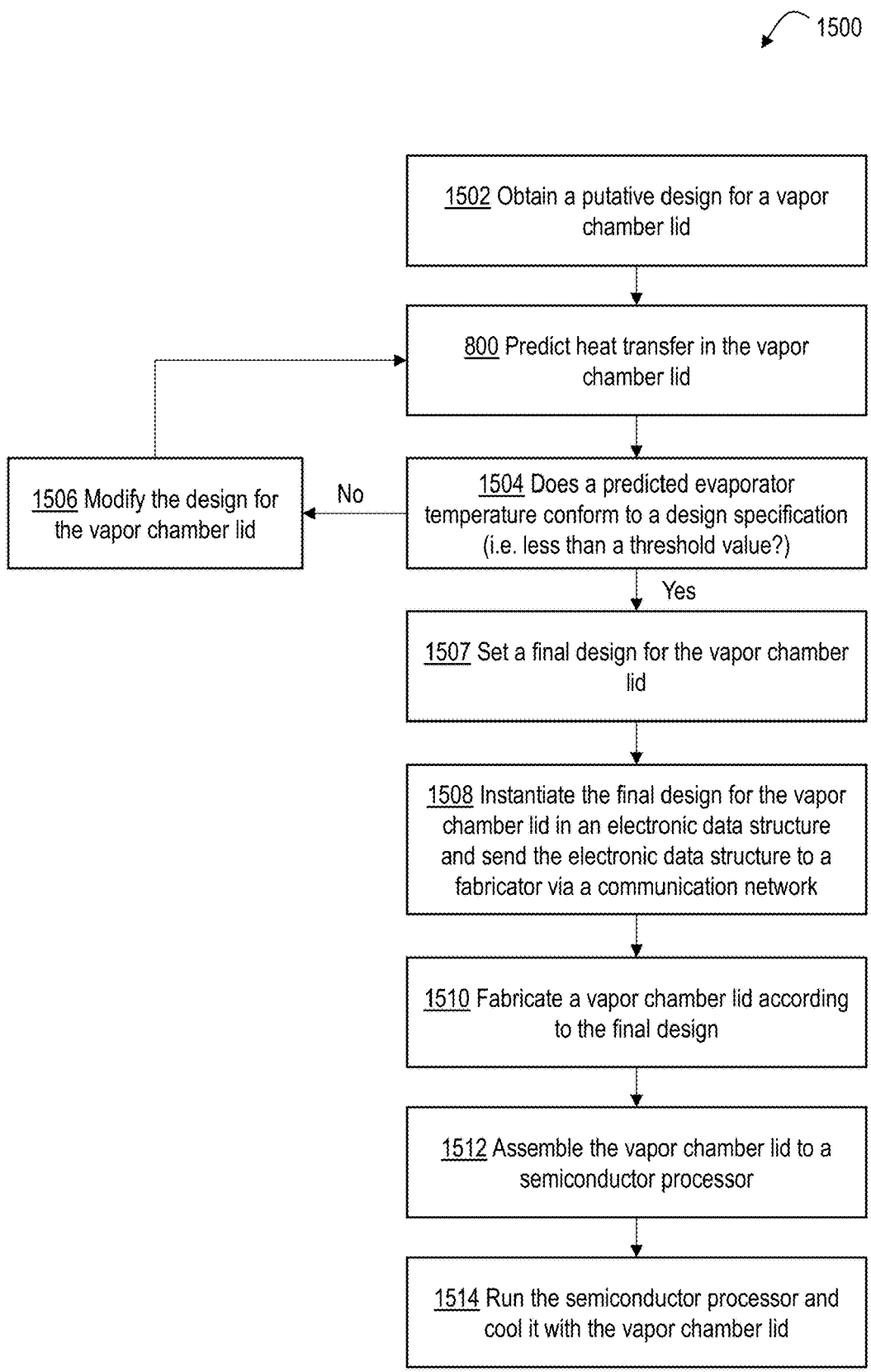
FIG. 15 depicts in a flowchart a method according to an exemplary embodiment.

Thermal contact resistance between top/bottom copper plates and wick was increased up to 10 C-mm$^2$/W. This change increased Tb marginally (<0.5 C), reduced T3 marginally, and did not affect T1,2,4,5. FIG. 15 depicts in a flowchart a method 1500 according to an exemplary embodiment. At 1502, obtain a putative design for a vapor chamber lid (e.g., the lid 100 of FIG. 1). At 800, predict heat transfer in the vapor chamber lid. At 1504, check whether a predicted evaporator temperature conforms to a design specification (i.e. is it less than a threshold value?). If not, then at 1506 modify the design for the vapor chamber lid. If yes, then at 1507 set a final design for the vapor chamber lid. At 1508, instantiate the final design for the vapor chamber lid in an electronic data structure and send the electronic data structure to a fabricator via a communication network. At 1510, fabricate a vapor chamber lid according to the final design. At 1512, assemble the vapor chamber lid to an electronic device (e.g., the lid 100 and processor 102 of FIG. 1). At 1514, run the electronic device and cool it with the vapor chamber lid. Step 1510 does not necessarily require step 1508. The skilled artisan will be familiar with rendering mechanical, electrical, thermal, and/or electronic designs in an electronic data structure using computer aided design/computer aided manufacturing (CAD/CAM) software.

Given the discussion thus far, it will be appreciated that, in general terms, an exemplary method, according to an aspect of the invention, includes at 1502 obtaining a putative design for a vapor chamber lid for an electronic device (a semiconductor processor is a non-limiting example of an electronic device); at 800 obtaining a steady state solution of governing equations of the putative design, wherein the governing equations include a thermal energy equation in a solid domain of the putative design and include continuity, momentum, and energy equations in vapor and liquid/wick domains of the putative design, by: at 802 calculating evaporator mass flux, evaporator heat flux, and evaporator temperature from the governing equations using an estimated vapor core temperature as a boundary condition; at 804 calculating condenser mass flux, condenser heat flux, and condenser temperature from the governing equations using evaporator mass flux, evaporator heat flux, and evaporator temperature as boundary conditions; at 806 calculating a power error between power produced by the electronic device and power emitted to ambient from the governing equations using the evaporator mass flux, evaporator heat flux, evaporator temperature, condenser mass flux, condenser heat flux, condenser temperature, and estimated vapor core temperature as boundary conditions; adjusting the estimated vapor core temperature using the power error; and at 820 repeating calculations of the evaporator mass flux, evaporator heat flux, evaporator temperature, condenser mass flux, condenser heat flux, condenser temperature, and power error and adjustment of the estimated vapor core temperature until the power error is less than a threshold value for power error; then, iteratively: at 1506 modifying the putative design in response to a difference between the evaporator temperature of the steady state solution and a threshold value for evaporator temperature, and at 800 obtaining a new steady state solution of the governing equations for the putative design; and at 1507 setting a final design for the vapor chamber lid when a satisfactory result is obtained for the difference between the evaporator temperature and the threshold value for evaporator temperature.

In one or more embodiments, the method also includes at 1508 instantiating the final design in an electronic data structure and sending the electronic data structure to a fabricator via a communication network.

In one or more embodiments, the method also includes at 1510 fabricating a vapor chamber lid according to the final design (by the fabricator that has received the design over the network, or otherwise).

In one or more embodiments, the method also includes at 1512 assembling the vapor chamber lid to an electronic device.

In one or more embodiments, the method also includes at 1514 running the electronic device and cooling it with the vapor chamber lid.

In one or more embodiments, mass flux due to evaporation at a liquid-vapor interface is calculated according to $$\dot{m}'' = \frac{2\sigma}{2-\sigma} \frac{h_{fg}\rho_{vap}}{RT_{sat}^2} \left(\frac{1}{2\pi R}\right)^{0.5} (T_{int} - T_{sat}),$$

where a is an accommodation coefficient, $T_{int}$ is a local interface temperature, $T_{sat}$ is the saturation temperature, $h_{fg}$ is the enthalpy of evaporation, $\rho_{vap}$ is the density of vapor, and R is the thermodynamic gas constant.

In one or more embodiments, the energy equation in the vapor domain is $$\nabla \cdot (\rho U H) = \nabla \cdot (\lambda \nabla T) + S_E$$

where $\rho$ is the density of the vapor, U is a velocity field, H is the specific enthalpy of the vapor, $\lambda$ is the thermal conductivity of the vapor, T is the uniform temperature of the vapor, and $S_E$ is an energy source/sink term.

In one or more embodiments, the momentum equation in the vapor domain is $$\nabla \cdot (\rho U \otimes U) = -\nabla p + \nabla \cdot (\mu(\nabla U + (\nabla U)^T))$$

where U is the velocity field, p is the pressure, $\mu$ is viscosity, and $\rho$ is the density.

In one or more embodiments, the continuity equation in the vapor domain is $$\nabla \cdot (\rho U) = S_V$$

where $\rho$ is the density, U is the velocity field, and $S_V$ is a mass source/sink term applied at the liquid/vapor interface to capture phase change mass transfer.

Figure 16:
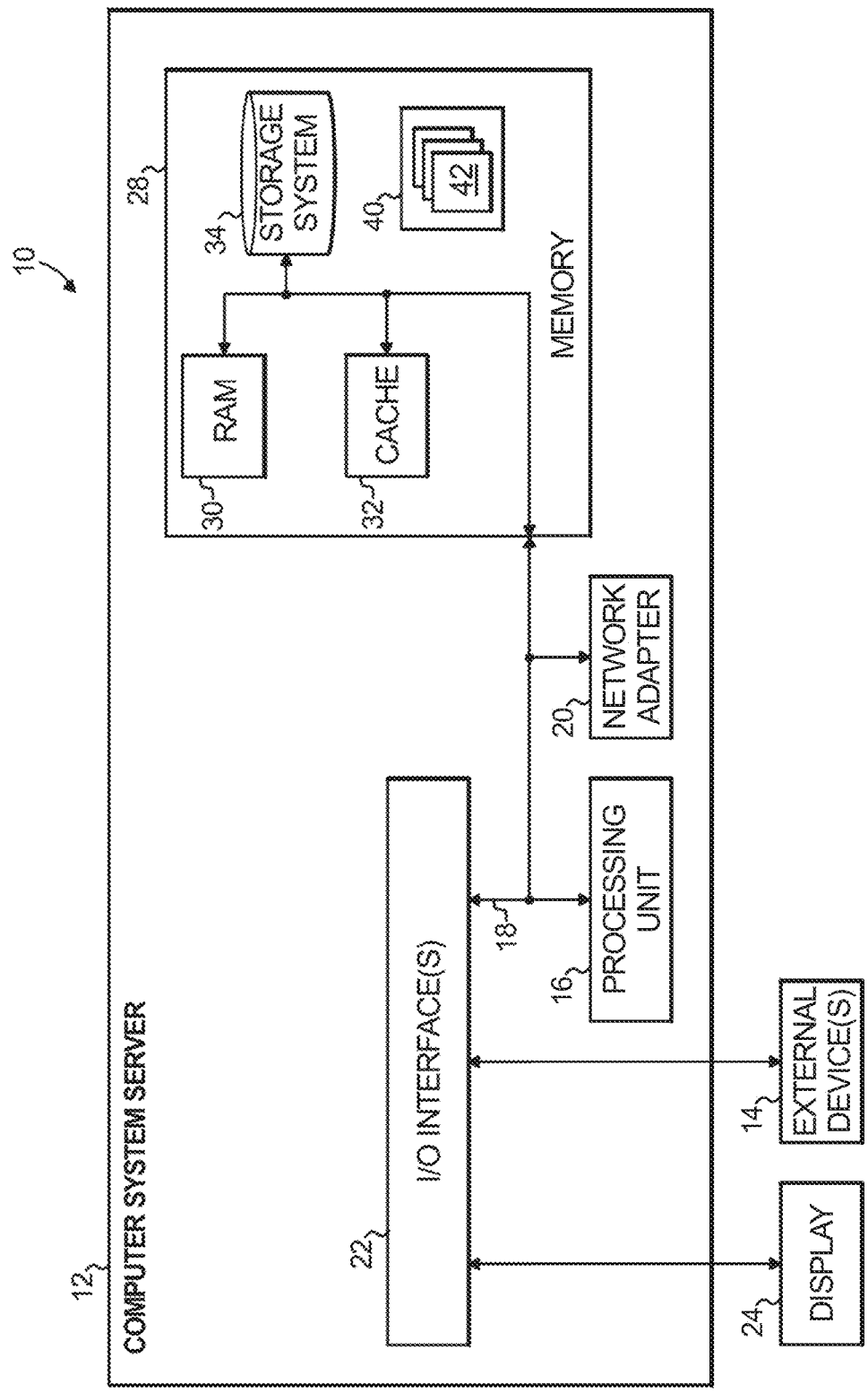
FIG. 16 depicts an exemplary computer system that is useful for implementing one or more embodiments of the invention.

One or more embodiments of the invention, or elements thereof, can be implemented in the form of an apparatus including a memory and at least one processor that is coupled to the memory and operative to facilitate exemplary method steps, or in the form of a non-transitory computer readable medium embodying computer executable instructions which when executed by a computer cause the computer to carry out or otherwise facilitate exemplary method steps. FIG. 16 depicts a computer system that may be useful in implementing one or more aspects and/or elements of the invention. Referring now to FIG. 16, computer system 10 includes a computer server 12, which is operational with numerous other general purpose or special purpose computing system environments or configurations. Examples of well-known computing systems, environments, and/or configurations that may be suitable for use with computer server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer server 12 may be described in the general context of computer system executable instructions, such as program modules, being executed by a computer system. Generally, program modules may include routines, programs, objects, components, logic, data structures, and so on that perform particular tasks or implement particular abstract data types. Computer server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer server 12 in system 10 is shown in the form of a general-purpose computing device. The components of computer server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer server 12 typically includes a variety of computer system readable media. Such media may be any available media that is accessible by computer server 12, and it includes both volatile and non-volatile media, removable and non-removable media.

System memory 28 can include computer system readable media in the form of volatile memory, such as random access memory (RAM) 30 and/or cache memory 32. Computer server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer server 12 may also communicate with one or more external devices 14 such as a keyboard, a pointing device, a display 24, etc.; one or more devices that enable a user to interact with computer server 12; and/or any devices (e.g., network card, modem, etc.) that enable computer server 12 to communicate with one or more other computing devices. Such communication can occur via Input/Output (I/O) interfaces 22. Still yet, computer server 12 can communicate with one or more networks such as a local area network (LAN), a general wide area network (WAN), and/or a public network (e.g., the Internet) via network adapter 20. As depicted, network adapter 20 communicates with the other components of computer server 12 via bus 18. It should be understood that although not shown, other hardware and/or software components could be used in conjunction with computer server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 16, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 16) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining a putative design for a vapor chamber lid for an electronic device;
   obtaining a steady state solution of governing equations of the putative design, wherein the governing equations include a thermal energy equation in a solid domain of the putative design and include continuity, momentum, and energy equations in vapor and liquid/wick domains of the putative design, by:
   calculating evaporator mass flux, evaporator heat flux, and evaporator temperature from the governing equations using an estimated vapor core temperature as a boundary condition;
   calculating condenser mass flux, condenser heat flux, and condenser temperature from the governing equations using evaporator mass flux, evaporator heat flux, and evaporator temperature as boundary conditions;
   calculating a power error between power produced by the electronic device and power emitted to ambient from the governing equations using the evaporator mass flux, evaporator heat flux, evaporator temperature, condenser mass flux, condenser heat flux, condenser temperature, and estimated vapor core temperature as boundary conditions;
   adjusting the estimated vapor core temperature using the power error, and
   repeating calculations of the evaporator mass flux, evaporator heat flux, evaporator temperature, condenser mass flux, condenser heat flux, condenser temperature, and power error and adjustment of the estimated vapor core temperature until the power error is less than a first threshold value for power error;
   iteratively:
   modifying the putative design in response to a difference between the evaporator temperature of the steady state solution and a second threshold value for evaporator temperature, and obtaining a new steady state solution of the governing equations for the putative design;
   setting a final design for the vapor chamber lid when the evaporator temperature is less than the second threshold value for evaporator temperature; and
   fabricating a vapor chamber lid according to the final design.

2. The method of claim 1 further comprising instantiating the final design in an electronic data structure and sending the electronic data structure to a fabricator via a communication network.

3. The method of claim 1 further comprising assembling the vapor chamber lid to an electronic device.

4. The method of claim 3 further comprising running the electronic device and cooling it with the vapor chamber lid.

5. The method of claim 1 wherein the evaporator mass flux and the evaporator heat flux are calculated at an interface of the liquid/wick domain and the vapor core domain with the evaporator mass flux $\dot{m}_e''$ calculated according to $$\dot{m}_e'' = \frac{2\sigma}{2-\sigma} \frac{h_{fg}\rho_{vap}}{RT_{sat}^2} \left(\frac{1}{2\pi R}\right)^{0.5} (T_{int} - T_{sat})$$

and the evaporator heat flux $\dot{q}_e''$ calculated according to $\dot{q}_e''=h_{fg}\dot{m}_e''$, where $\sigma$ is an accommodation coefficient, $T_{int}$ is a local interface temperature, $T_{sat}$ is the saturation temperature, $h_{fg}$ is the latent heat of evaporation, $\rho_{vap}$ is the density of vapor, and R is the thermodynamic gas constant.

6. The method of claim 1 wherein a profile for the evaporator mass flux $\dot{m}_e''$ is used to determine a fraction of the vapor chamber internal surface that acts as an evaporator and another fraction of the internal surface that acts as a condenser.

7. The method of claim 1 wherein the momentum equation in the vapor domain is $\nabla \cdot (\rho U \otimes U) = -\nabla p + \nabla \cdot (\mu(\nabla U + (\nabla U)^T))$ where U is the velocity field, p is the pressure, $\mu$ is viscosity, and $\rho$ is the density.

8. The method of claim 1 wherein the continuity equation in the vapor domain is $\nabla \cdot (\rho U) = S_V$ where $\rho$ is the density, U is the velocity field, and $S_V$ is a mass source/sink term applied at the liquid/vapor interface to capture phase change mass transfer.

9. A non-transitory computer readable medium embodying computer executable instructions, which when executed by a computer cause the computer to implement the method of:
- obtaining a putative design for a vapor chamber lid for an electronic device;
- obtaining a steady state solution of governing equations of the putative design, wherein the governing equations include a thermal energy equation in a solid domain of the putative design and include continuity, momentum, and energy equations in vapor and liquid/wick domains of the putative design, by:
- calculating evaporator mass flux, evaporator heat flux, and evaporator temperature from the governing equations using an estimated vapor core temperature as a boundary condition;
- calculating condenser mass flux, condenser heat flux, and condenser temperature from the governing equations using evaporator mass flux, evaporator heat flux, and evaporator temperature as boundary conditions;
- calculating a power error between power produced by the electronic device and power emitted to ambient from the governing equations using the evaporator mass flux, evaporator heat flux, evaporator temperature, condenser mass flux, condenser heat flux, condenser temperature, and estimated vapor core temperature as boundary conditions;
- adjusting the estimated vapor core temperature using the power error; and
- repeating calculations of the evaporator mass flux, evaporator heat flux, evaporator temperature, condenser mass flux, condenser heat flux, condenser temperature, and power error and adjustment of the estimated vapor core temperature until the power error is less than a first threshold value for power error;
- iteratively:
- modifying the putative design in response to a difference between the evaporator temperature of the steady state solution and a second threshold value for evaporator temperature, and
- obtaining a new steady state solution of the governing equations for the putative design;
- setting a final design for the vapor chamber lid when the evaporator temperature is less than the second threshold value for evaporator temperature; and
- fabricating a vapor chamber lid according to the final design.

10. The computer readable storage medium of claim 9 wherein the method further comprises instantiating the final design in an electronic data structure and sending the electronic data structure to a fabricator via a communication network.

11. The computer readable storage medium of claim 9 wherein the evaporator mass flux and the evaporator heat flux are calculated at an interface of the liquid/wick domain and the vapor core domain with the evaporator mass flux $\dot{m}_e''$ calculated according to a function of a coolant saturation temperature and a temperature difference between the evaporator temperature and the vapor core temperature.

12. The computer readable storage medium of claim 9 wherein the energy equation in the vapor domain is $$\nabla \cdot (\rho U H) = \nabla \cdot (\lambda \nabla T) + S_E$$

where $\rho$ is the density of the vapor, U is a velocity field, H is the specific enthalpy of the vapor, $\lambda$ is the thermal conductivity of the vapor, T is the temperature of the vapor, and $S_E$ is an energy source/sink term.

13. The computer readable storage medium of claim 9 wherein the momentum equation in the vapor domain is $$\nabla \cdot (\rho U \otimes U) = -\nabla p + \nabla \cdot (\mu(\nabla U + (\nabla U)^T))$$

where U is the velocity field, p is the pressure, $\mu$ is viscosity, and $\rho$ is the density.

14. The computer readable storage medium of claim 9 wherein the continuity equation in the vapor domain is $$\nabla \cdot (\rho U) = S_V$$

where $\rho$ is the density, U is the velocity field, and $S_V$ is a mass source/sink term applied at the liquid/vapor interface to capture phase change mass transfer.

15. An apparatus comprising:
- a memory embodying computer executable instructions; and
- at least one processor, coupled to the memory, and operative by the computer executable instructions to facilitate a method of:
- obtaining a putative design for a vapor chamber lid for an electronic device;
- obtaining a steady state solution of governing equations of the putative design, wherein the governing equations include a thermal energy equation in a solid domain of the putative design and include continuity, momentum, and energy equations in vapor and liquid/wick domains of the putative design, by:
- calculating evaporator mass flux, evaporator heat flux, and evaporator temperature from the governing equations using an estimated vapor core temperature as a boundary condition;
- calculating condenser mass flux, condenser heat flux, and condenser temperature from the governing equations using evaporator mass flux, evaporator heat flux, and evaporator temperature as boundary conditions;
- calculating a power error between power produced by the electronic device and power emitted to ambient from the governing equations using the evaporator mass flux, evaporator heat flux, evaporator temperature, condenser mass flux, condenser heat flux, condenser temperature, and estimated vapor core temperature as boundary conditions;
- adjusting the estimated vapor core temperature using the power error; and
- repeating calculations of the evaporator mass flux, evaporator heat flux, evaporator temperature, condenser mass flux, condenser heat flux, condenser temperature, and power error and adjustment of the estimated vapor core temperature until the power error is less than a first threshold value for power error;
- iteratively:
- modifying the putative design in response to a difference between the evaporator temperature of the steady state solution and a threshold value for evaporator temperature, and
- obtaining a new steady state solution of the governing equations for the putative design;
- setting a final design for the vapor chamber lid when the evaporator temperature is less than the second threshold value for evaporator temperature; and
- fabricating a vapor chamber lid according to the final design.

16. The apparatus of claim 15 wherein the method further comprises instantiating the final design in an electronic data structure and sending the electronic data structure to a fabricator via a communication network.

17. The apparatus of claim 15 wherein the method further comprises assembling the vapor chamber lid to an electronic device.

18. The apparatus of claim 17 wherein the method further comprises running the electronic device and cooling it with the vapor chamber lid.

\* \* \* \* \*